Nov. 14, 1972    B. BEVENGUT    3,702,684
FLUIDIC CONTROL MIXING NOZZLE

Filed Feb. 4, 1971    2 Sheets-Sheet 1

Inventor:
Bernard Bevengut
BY Baldwin Wight & Brown
Attorneys

United States Patent Office 3,702,684
Patented Nov. 14, 1972

3,702,684
FLUIDIC CONTROL MIXING NOZZLE
Bernard Bevengut, Paris, France, assignor to Societe Anonyme dite: Etablissements Pierre Bevengut, Vaucluse, France
Filed Feb. 4, 1971, Ser. No. 112,728
Claims priority, application France, Feb. 11, 1970, 7004842
Int. Cl. B05b 7/12
U.S. Cl. 239—412          13 Claims

ABSTRACT OF THE DISCLOSURE

A fluid controlled nozzle device in which the stopping or reversing of a flow of a fluid to be atomized or propelled is effected by a driving fluid. The device comprises a convergent-divergent nozzle, one or more pipes carrying driving fluids are connected to the upstream end of the nozzle, an outlet orifice is located in the downstream end thereof. A tube for feeding a fluid to be propelled or atomized is adjustably mounted in the upstream portion of the nozzle. At a predetermined pressure of the driving fluid the zone surrounding the outlet orifice is at a low pressure thereby enabling the discharge of propelled or atomized fluid through the outlet orifice. By varying the pressure of the driving fluid the outlet orifice is in a zone at a high pressure to stop or limit the flow of the fluid from the outlet orifice. The device is particularly useful in atomization, powdering pressure, flow control and the conveying of powdery materials.

The present invention relates to a fluid or pneumatic control mixing nozzle which permits the stopping or limiting of the flow of any sort of fluid at the end of a conduit, using as driving means the dynamic flow phenomena resulting from the use of fluids at high pressure or at low pressure.

In order to make any fluid flow in a conduit, it is necessary to use a force which may be a positive pressure, a reduced pressure or suction or simply gravity. The stopping of such a flow is therefore generally effected by removing this force or its effect by closing a valve.

If driving or stopping devices are remote from the control point there is inevitably a certain delay in their action. For example, if an atomizing nozzle producing a jet is in question, the control means are delicate devices which risk being worn out very quickly especially if they are permanently in contact with a fluid carrying solid particles.

Further, in the majority of cases the separated control devices of the driving devices require the use of a supplementary mechanical, electrical, pneumatic or manual force and control, circuits therefor.

The device according to the invention overcomes these drawbacks in an extremely simple manner while using for stopping or limiting the flow of a fluid at the end of a conduit using exclusively dynamic flow phenomena.

To this end, the invention consists in a method of controlling the flow of a fluid to be propelled or atomized in a tube, said tube being disposed in the upstream portion of a nozzle, the outlet orifice of the propulsion or atomizating device being disposed in the downstream portion, said upstream portion being connected to at least one conduit carrying a driving fluid under pressure, comprising changing the pressure in the driving fluid in order to create at the outlet orifice of the tube a variable high or low pressure zone. The shape of the nozzle depends on the particular application, but it is substantially convergent-divergent or it has a convergent portion followed by a cylindrical portion, the cylindrical portion may in turn be followed by a divergent portion.

The invention also concerns a fluid control mixing nozzle to be used in carrying out the above method.

According to a first embodiment, the mixing nozzle comprises a conduit having an upstream portion connected to one or more conduits carrying a driving fluid at a variable adjustable pressure and having a downstream portion including an outlet orifice, a tube for feeding a fluid to be propelled or atomized adjustably mounted in the upstream portion, such that for a given pressure of the driving fluid, the said orifice is located in a low pressure and delivery zone for the fluid, whereas by changing the pressure of the driving fluid, the orifice is located in a high pressure zone which prevents or limits the flow of fluid at the outlet. As had been noted above, the interior shape of the conduit is preferably convergent-divergent, convergent-cylindrical, or convergent-cylindrical-divergent. In an embodiment given by way of example, the shape is convergent-divergent with an inlet angle of approximately 50° and an outlet angle of approximately 7°.

According to an alternative embodiment, means are provided responsive to change of pressure of the driving fluid for relative, adjustable displacement between the convergent-divergent conduit and the tube in order to facilitate the creation of and amplify the variable high pressure or low pressure zone.

The invention is described in greater detail hereinafter with reference to the accompanying drawings in which:

FIG. 1 schematically shows the principle of operation of the nozzle according to the invention;

FIG. 2 schematically illustrates the use of the nozzle according to the invention in an atomizing apparatus;

Figure 5:
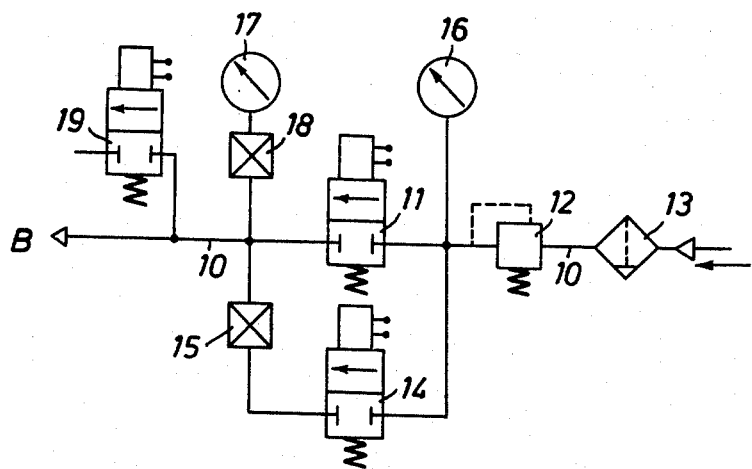

FIG. 5 schematically shows a control device according to the present invention.

The method of nozzle control according to the invention is based on the use of high and low pressure zones which are created and vary, according to the pressure, the shape and the relative arrangement of the elements which are subject to the effect of the fluid in order to create a compression or depression for stopping or reversing the flow in the line.

It is noted that in a nozzle T for a given position of the end of the tube C the flow of a driving fluid at a given pressure causes a reduction in pressure at the orifice of the tube. If the pressure of the driving fluid is changed to a given value, the end of the tube C will no longer be in the depression low pressure zone but on the contrary in a high pressure zone. Furthermore, this effect can be facilitated and amplified by varying the position of the end of the tube C with respect to the neck of the nozzle T.

An interesting application of the mixing nozzle according to the invention is in atomizing apparatus. In this case the mixing nozzle operates by the sucking-up of liquid to be atomized. The same driving fluid used for the atomization may be used for the starting and the stopping of the nozzle.

Figure 1:
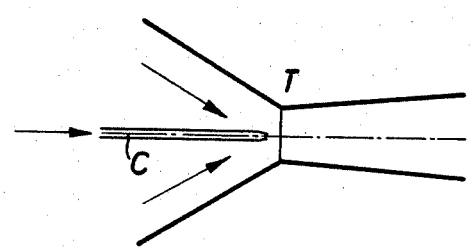
Figure 2:
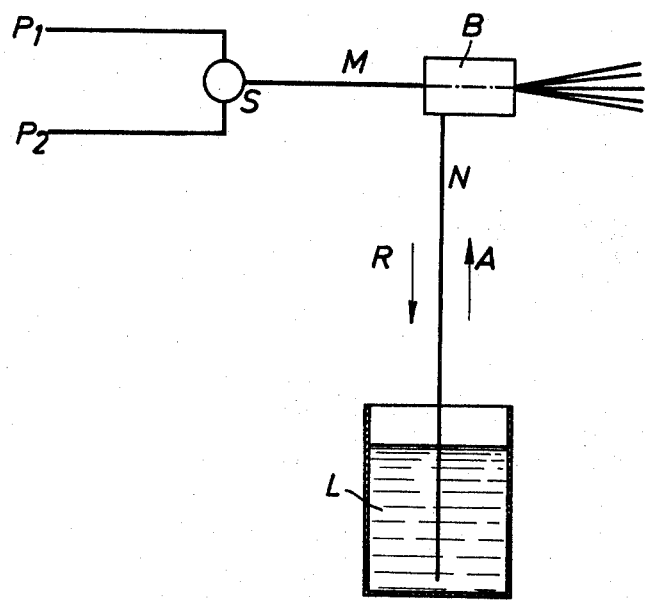

FIG. 2 schematically illustrates the operation of such an atomizing apparatus. The mixing nozzle B is connected to a conduit M with a selecting valve to which is connected two conduits $P_1$ and $P_2$ carrying air at different pressures. The mixing nozzle B is also connected by a tube N to a tank L containing liquid to be atomized.

In this apparatus the expansion of air fed to the mixing nozzle B by the conduit $P_1$ for example assures the atomization of the liquid drawn up from the tank L via tube N with or without supplementary flow.

The atomizing is stopped by rapidly varying the pressure of the driving air to create a high pressure zone at the orifice of tube N (stopping or reducing the flow rate if there is a driving pressure acting on the liquid). The rapid pressure change can be effected, for example, by means of the selecting valve S by passing from conduit $P_1$ to conduit $P_2$, where the air in conduit $P_1$ is at a pressure much greater than that in the conduit $P_1$.

This counter-pressure can also be used to cause a reverse flow of air in the tube N in order to blow off the latter, for siphon unpriming, for bubbling the liquid in the tank while the atomizing is stopped thus creating a current R flowing in the direction opposite to the current A.

Such an atomizing apparatus can be easily brought under the control of the operating cycle of a machine having only a single compressed air circuit.

Figure 3:
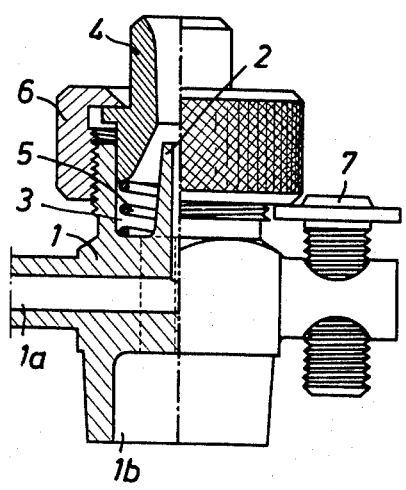
FIG. 3 shows an elevation view partially in section of an embodiment of a nozzle according to the invention.

FIG. 3 shows an embodiment of a mixing nozzle according to the invention. This mixing nozzle comprises a body 1 having an inlet 1a for introducing fluid to be vaporized or sprayed and a spray nozzle 2 whose axis is at right angles with the axis of the inlet 1a. The spray nozzle 2 is surrounded by an annular space 3 into which extends the upstream end of a convergent-divergent spout 4 coaxial with the spray nozzle 2. The space 3 is in communication with an inlet for introducing driving fluid (air for example) at a variable, adjustable pressure. Between the bottom of the space 3 and the spout 4 is interposed a spring 5 simply serving to urge the spout 4 against a knurled clamping nut 6 in a predetermined pre-adjustment position. The spout 4 is maintained in adjusted position by the clamping nut 6 which is screwed onto the body of the vaporizing or spraying device.

The interior shape of the spout 4 is chosen in order to obtain the sought after effect on the flow of fluids according to the desired pressures and volumes, e.g. a maximum suction at a certain point and a certain pressure and the special suction variation effect as a function of the pressure of the driving fluid.

The interior shape of the spout 4 is substantially convergent-divergent with successions of angular sections. The convergent section may possibly be separated from the divergent section by a cylindrical section and the shape of the interior shape of the spout may vary as it depends on the characteristics of the apparatus.

In this embodiment, the separation between the spraying nozzle and the spout 4 is set in the course of operation, and the spray nozzle-spout distance is determined beforehand. The position of the spout 4 is held by an adjustable stop 7. The displacement of the low pressure high pressure zones in line with the spray nozzle 2 is effected by merely varying the pressure of the driving fluid.

A pressure rise or drop to the predetermined pressures of the driving fluid introduced by the inlet 1b is thus effected at the inlet 1a.

Figure 4:
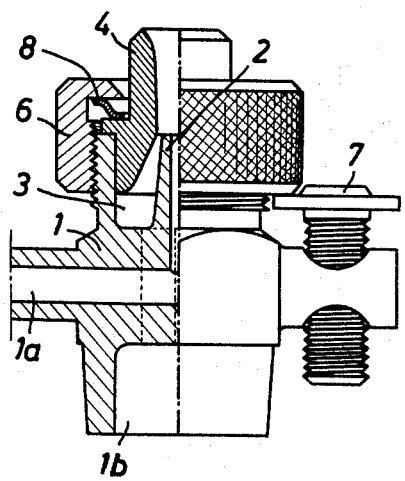
FIG. 4 shows an alternative embodiment of the nozzle shown in FIG. 3.

FIG. 4 shows a variation of the embodiment of FIG. 3 in which the spring 5 is replaced by a calibrated spring 8 interposed between the spout and the nut 6. The calibrated spring 8 acts as a stop against the spout 4 to maintain it at a low pressure; the spray nozzle is in zone of lowest pressure or maximum depression. The stop means 7 enables the spring 8 to be put under a tension determined as a function of the pressures used. At a higher pressure, the spring 8 collapses under the force exerted by the air acting on the upstream portion of the spout 4: the spray nozzle 2 is thus in position upstream of the neck of the spout 4 in a reverse flow zone.

This displacement of the spout 4 with respect to the spray nozzle 2 under the action of the variation of the pressure of the driving fluid produces an effect which is added to that obtained by the simple variation of the pressure of the driving fluid. In other words the axial displacement of the spout 4 facilitates and amplifies the creation of low and high pressure zones in line with the downstream end of the spray nozzle 2. Of course it is the relative displacement of the spray nozzle 2 and the spout 4 that matters accordingly fixed spout and an axially movable spray nozzle could be provided for example.

FIG. 5 shows an apparatus for controlling the pressures of a driving fluid, for example a combination of vaporizing mixing nozzle or spraying devices such as shown in FIG. 3 or 4. Such an apparatus comprising a conduit 10 connected on one hand to one or more mixing nozzles B (not shown) and on the other hand to a source of air at a constant pressure (not shown) via an electrically operated valve 11, a pressure-reducing valve 12 and a manual blow-off filter 13. The electrically operated valve 11 is shunted by a second electrically operated valve 14 in series with a pressure adjusting tap 15. Upstream of the valve 11 a manometer 16 for controlling the feed pressure is branched off the conduit 10. A manometer 17 for controlling modulated pressures is connected via safety valve 18 to conduit 10 downstream of the valve 11. Finally, downstream of the valves 11 and 14 another electrically operated exhaust valve is branched off the conduit 10. The valves 11 and 14 are opened by the flow of current whereas the valve 19 is closed by the flow of current.

The operation of such an apparatus is quite straight forward. For example by opening the valve 10 a high pressure (back flow or forward flow) is applied to the mixing nozzle B, the valve 19 being closed. On the contrary by actuating the valve 14, keeping the valve 19 closed, air for atomizing at a low pressure is sent to the mixing nozzle B.

The present invention is applicable for atomizing liquids, for powdering or even for a device for pneumatically conveying powdery materials. Further, the mixing nozzle according to the invention may be used as a pressure control or a flow control and in pneumatic logic circuits, as well as in all the cases where the stopping or reversing of pressure in a conduit is required.

The variation of the pressure in the tube N for a given set up causes a variation of the pressure whether positive or negative in the tube N. Therefore independent of the simple suction, stopping or back flow in the tube N, by the variation of the pressure in the tube N, the pressure variation in N can be systematically followed according to the pressure variation in M.

The variation in N cannot only be used as a signal but also in putting to use the flow obtained by the changes in suction or back flow in N to operate directly a pneumatic sensor, such as a diaphragm or a jack, acting in turn on an auxiliary regulating mechanism.

What is claimed is:

1. A mixing nozzle assembly comprising a nozzle body having an outlet, a product supply inlet into said nozzle body, a propellant supply inlet into said nozzle body, and control means within said nozzle body responsive to the supplying of propellant through said propellant supply inlet at a first positive pressure to effect flow of product into said nozzle body for mixing with propellant flowing through said nozzle body, said control means being further responsive to the supplying of propellant through said propellant supply inlet at a second positive pressure to stop product flow through said product supply inlet while retaining said product supply inlet in physical conductive relation with said outlet.

2. The mixing nozzle of claim 1 wherein said control means and said nozzle body relationship is one providing for propellant flow throughout said nozzle body at said second positive pressure to purge said nozzle body of product.

3. The mixing nozzle of claim 1 wherein said control means provides a positive propellant pressure in said product supply inlet at said second positive pressure to reverse product flow in said product supply inlet.

4. The mixing nozzle of claim 1 wherein said second positive pressure is higher than said first positive pressure.

5. The mixing nozzle of claim 1 together with a product supply source, a product supply line communicating said product supply source with said product supply inlet, and wherein said control means provides a positive propellant pressure in said product supply inlet with propellant back flow through said product supply line at said second positive pressure.

6. The mixing nozzle of claim 1 wherein said control means include a discharge spout, and means mounting said discharge spout for movement between first and second positions in accordance with the selective supplying of propellant at said first and second pressures with said discharge spout remaining in communication with both said propellant supply inlet and said product supply inlet in all positions thereof.

7. The mixing nozzle of claim 1 wherein said control means include internal spray nozzle means for discharging product only, and cooperating discharge spout means for receiving sprayed product from said spray nozzle means and controlled quantities of product and mixing and discharging same.

8. The mixing nozzle of claim 7 wherein one of said spray nozzle means and said discharge spout means is fixed and the other is relatively movable with respect thereto.

9. The mixing nozzle of claim 7 wherein said spray nozzle means includes an outlet, and said propellant supply inlet is upstream of said spray nozzle means outlet.

10. The mixing nozzle of claim 7 wherein said spray nozzle means is fixed, said discharge spout means is partially telescoped over said spray nozzle means and defining therewith a variable propellant orifice surrounding said spray nozzle means.

11. The mixing nozzle of claim 1 wherein flow of product into said nozzle body is suction flow in response to propellant flow through said nozzle body.

12. A mixing nozzle according to claim 7 wherein the discharge spout means and the spray nozzle means are ararnged coaxially, one of these being movable with respect to the other in response to the flow of the propellant.

13. A mixing nozzle according to claim 8 wherein a calibrated spring is provided to act in opposition to the force of the propellant acting on the movable one of the spray nozzle means and the discharge spout means.

References Cited
UNITED STATES PATENTS

| | | | |
|---|---|---|---|
| 1,843,715 | 2/1932 | Gavino | 239—417 |
| 3,202,363 | 8/1965 | Kautz et al. | 239—412 X |
| 2,405,375 | 8/1946 | Smith | 239—416.5 X |
| 3,464,625 | 9/1969 | Carlsson | 239—434.5 X |
| 1,975,033 | 9/1934 | Wolff | 239—416.5 |
| 1,748,604 | 2/1930 | Heimburger | 239—434.5 |
| 2,013,302 | 9/1935 | Ferguson | 239—434.5 X |
| 2,820,418 | 1/1958 | Sullivan et al. | 239—434.5 X |
| 3,275,247 | 9/1966 | Hammelmann | 239—570 X |

M. HENSON WOOD, JR., Primary Examiner

T. C. CULP, JR., Assistant Examiner

U.S. Cl. X.R.

239—106, 416.5, 434.5